(12) United States Patent
Byun et al.

(10) Patent No.: US 11,483,445 B2
(45) Date of Patent: Oct. 25, 2022

(54) TEMPERATURE ESTIMATION OF DC MOTOR BASED ON SENSING VOLTAGE

(71) Applicant: Hewlett-Packard Development Company, L.P., Spring, TX (US)

(72) Inventors: Ji-Young Byun, Pangyo (KR); Hyoungil Kim, Pangyo (KR); Yong-Ho You, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/414,098

(22) PCT Filed: Mar. 13, 2020

(86) PCT No.: PCT/US2020/022630
§ 371 (c)(1),
(2) Date: Jun. 15, 2021

(87) PCT Pub. No.: WO2020/219175
PCT Pub. Date: Oct. 29, 2020

(65) Prior Publication Data
US 2022/0046140 A1    Feb. 10, 2022

(30) Foreign Application Priority Data

Apr. 22, 2019 (KR) .................. 10-2019-0046659

(51) Int. Cl.
*H04N 1/23* (2006.01)
*H04N 1/00* (2006.01)
*H04N 1/31* (2006.01)

(52) U.S. Cl.
CPC ....... *H04N 1/2346* (2013.01); *H04N 1/00978* (2013.01); *H04N 1/31* (2013.01); *H04N 2201/0094* (2013.01)

(58) Field of Classification Search
None
See application file for complete search history.

(56) References Cited

U.S. PATENT DOCUMENTS

| 4,849,677 A | 7/1989 | Kruger |
| 6,798,538 B1 | 9/2004 | Yamada et al. |
| 8,662,620 B2 | 3/2014 | Urban et al. |

(Continued)

FOREIGN PATENT DOCUMENTS

| EP | 1266762 B1 | 11/2005 |
| JP | 4543939 B2 | 9/2010 |

(Continued)

OTHER PUBLICATIONS

JP 6016750 translation (Year: 2016).*

*Primary Examiner* — Lennin R Rodriguezgonzalez
(74) *Attorney, Agent, or Firm* — Jefferson IP Law, LLP

(57) ABSTRACT

An image forming apparatus includes a print engine, a DC motor, a driving circuit, and a processor. The print engine forms an image. The DC motor drives the print engine. The driving circuit provides a current to the DC motor, and senses a variation of the current provided to the DC motor. The processor calculates a temperature of the DC motor based on the variation of the current flowing through the DC motor, and controls an operation of the image forming apparatus based on the calculated temperature.

20 Claims, 10 Drawing Sheets

(56) References Cited

U.S. PATENT DOCUMENTS

2006/0290770 A1    12/2006  Leblanc
2013/0127944 A1*  5/2013  Urban .................... B41J 2/0057
                                          347/17

FOREIGN PATENT DOCUMENTS

| JP | 6016750 B2 * | 10/2016 |
|----|--------------|---------|
| JP | 2016214002 A | 12/2016 |
| JP | 2016220441 A | 12/2016 |
| JP | 6330523 B2 | 5/2018 |

* cited by examiner

TEMPERATURE ESTIMATION OF DC MOTOR BASED ON SENSING VOLTAGE

CROSS-REFERENCE TO RELATED APPLICATIONS

This application claims priority from Korean Patent Application No. 10-2019-0046659, filed on Apr. 22, 2019, in the Korean Intellectual Property Office, the disclosure of which is incorporated herein by reference in its entirety.

BACKGROUND

An image forming apparatus is an apparatus for generating, printing, receiving and/or transmitting image data. Examples of the apparatus include a printer, a scanner, a copy machine, a facsimile, and a multi-function peripheral (MFP) that integrally implements these functions.

An image forming apparatus uses motors for performing various functions such as moving print paper, driving a print engine, etc.

DETAILED DESCRIPTION

In the following description, with reference to the drawings, the same reference numbers are assigned to the same components or to similar components having the same function, and overlapping description is omitted.

In the present disclosure, a case in which a component is "connected" with another component includes a case in which a component is 'directly connected' to another component and a case in which a component is 'connected to another component while having the other component interposed therebetween'. In addition, a case in which any component "comprises" another component means that the component may further comprise other components, without excluding other components, unless explicitly described to the contrary.

The expression "image forming job" may refer to various jobs related with an image, such as, formation of image or generation/storage/transmission of image files (e.g., printing, scanning or faxing), and the expression "job" as used herein may refer to the image forming job, and also to a series of processes for performance of the image forming job.

The expression "image forming apparatus" may refer to a device for printing print data generated from a terminal such as a computer on a recording paper. Examples of the image forming apparatus described above may include a copier, a printer, a facsimile, a multi-function printer (MFP) of complexly implementing functions thereof through a single device, and the like.

The expression "printing data" may refer to data converted into a format that can be printed at the printer. When the printer supports direct printing, the file itself may be the printing data.

The expression "user" may refer to a person who performs manipulation related with the image forming job using the image forming apparatus or a device connected to the image forming apparatus wired or wirelessly.

Figure 1:
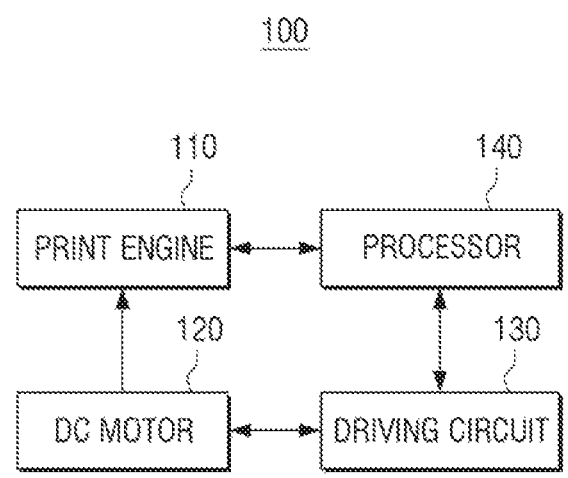
FIG. 1 is a block diagram of an example configuration of an image forming apparatus.

FIG. 1 is a block diagram illustrating a brief configuration of an example image forming apparatus.

Referring to FIG. 1, an image forming apparatus 100 may include a print engine 110, a direct current (DC) motor 120, a driving circuit 130, and a processor 140.

The print engine 110 may perform an image forming job. For example, the print engine 110 may perform an image forming job under the control of the processor 140 and by the driving of the DC motor 120. An example configuration and operation of the print engine 110 will be described with reference to FIG. 3.

The DC motor 120 may be a DC motor provided inside the image forming apparatus 100, and perform constant speed driving or accelerated speed driving according to the magnitude of an input current. For example, the DC motor 120 may perform various functions of the image forming apparatus 100 such as driving an Organic Photo Conductor (OPC) (e.g., an OPC drum), driving a fixing device, conveying paper sheet, etc.

The driving circuit 130 may generate a driving power source (e.g., a constant current) for the DC motor 120 according to a control command and provide the driving power source to the DC motor 120. For example, the driving circuit 130 may receive the driving command (e.g., current magnitude information) from the processor 140, and provide the constant current corresponding to the received current magnitude information to the DC motor 120.

The driving circuit 130 may sense a variation of a current provided to the DC motor 120. The driving circuit 130 may return (or feedback) a magnitude of a constant current provided to the DC motor 120 using a shunt resistance and render the magnitude of the current provided to the DC motor 120 to be constant (e.g., to output a current of a predetermined magnitude (constant current)). The driving circuit 130 may sense a variation of a current provided to the DC motor 120 using the shunt resistance.

The voltage of the shunt resistant may change in proportion to the temperature of the DC motor 120. According to the disclosure, it is possible to estimate the temperature of the DC motor 120 using the voltage value of the shunt resistance. The correlation between the voltage of the shunt resistance and the temperature of the DC motor 120 will be described with reference to FIG. 6.

The driving circuit 130 may perform the signal processing of the sensed variation of the current and output the signal processed current. The driving circuit 130 may perform low-pass-filtering on a voltage of the shunt resistance corresponding to a current change of a coil, amplify the low pass filtered voltage value, and output the amplified voltage value to the processor 140. The detailed configuration and operation of the driving circuit 130 will be described with reference to FIG. 4.

The processor 140 may control each configuration of the image forming apparatus 100. When a print command is received, the processor 140 may control the operation of the print engine 110 so that print data corresponding to the received print command may be printed, and transmit the driving command for the DC motor 120 that drives the print engine 110 to the driving circuit 130. For example, the processor 140 may transmit control commands such as rotation start/stop, acceleration/deceleration, speed command value, etc. for the DC motor 120 to the driving circuit 130. According to an example, it has been described that the processor 140 transmits a control command for the DC motor 120, but in other examples, the print engine 110 may transmit a control command to the DC motor 120.

The processor 140 may receive voltage magnitude information of the shunt resistance sensed by the driving circuit 130. The processor 140 may calculate (or estimate) a temperature of the DC motor 120 based on the magnitude of the voltage transmitted through an analog-to-digital converter (ADC) port (or terminal).

The processor 140 may receive the brush position information (or phase information) of the DC motor 120 sensed by the driving circuit 130. The processor 140 may receive the signal from an encoder that outputs a predetermined signal when the DC motor rotates once, and calculate the temperature of the DC motor 120 based on the magnitude of the voltage transmitted through the ADC port at the time of receiving the predetermined signal.

In order to measure the temperature of the DC motor 120 on a regular basis, even if the DC motor 120 fails to drive, the processor 140 may control the driving circuit 130 so that a constant current for temperature measurement may be provided at a predetermined period.

The current magnitude for temperature measurement may be the largest one of the current magnitudes in which the DC motor 120 is prevented from rotating in a state where a driving load of the image forming apparatus 100 is at its lowest. The current magnitude for temperature measurement may vary depending on the type and operational environment of the image forming apparatus 100.

The processor 140 may control the operation of the image forming apparatus 100 based on the calculated temperature of the DC motor 120. The processor 140 may determine whether the calculated temperature of the DC motor is within or beyond a normal range, and if the temperature is beyond the normal range, the processor 140 may perform a limited print operation or may not perform a print operation.

For example, the processor 140, if the calculated temperature is within a predetermined first temperature range, may perform a requested print job, for example, the processor 140 may operate in a normal mode. The processor 140 may perform a requested print job in a stress mode if the calculated temperature is in a second temperature range higher than the predetermined first temperature range.

The stress mode may be a mode in which the image forming apparatus 100 performs a print job with limited print speed. Whether to enter the stress mode may be determined according to the temperature of the DC motor 120, and the number of prints of a print job of a user. That is, if the temperature of the DC motor 120 is low, and the number of prints of the user is more than 100 pages, the processor 140 may determine an operation mode of the image forming apparatus 100 as the stress mode.

When entering the stress mode, the processor 140 may lower the print speed of the image forming apparatus 100. For example, when the image forming apparatus 100 is at a print speed of 14 ppm (pages per minute), the processor 140 may perform a print job at the print speed of 14 ppm at a normal temperature, and at the print speed of 7 ppm lower than 14 ppm in the stress mode. The print speed in the stress mode may be determined by the function or the application environment of the image forming apparatus.

When entering the stress mode, the processor 140 may change a reference range of the number of consecutive prints. This is because, at a relatively high temperature, image quality may be deteriorated by a continuous printing of a lesser number of prints rather than at a normal temperature.

For example, when the reference number of consecutive prints at a normal temperature is 100, the reference number may be changed to 50 in the second temperature range. However, such numbers are non-exhaustive examples, and could be modified according to the function and the location of the image forming apparatus.

According to an example, it has been illustrated and described that the image forming apparatus has one stress mode. In some example implementations, the image forming apparatus may have a plurality of stress modes according to variations of temperatures.

If the calculated temperature is beyond a predetermined first temperature range or second temperature range, that is, the calculated temperature is lower than the first temperature range or higher than the second temperature range, the processor 140 may not perform the requested print job. The first temperature range may be between 0° C. and 50° C., and the second temperature range may be between 50° C. to 70° C. However, such temperature ranges are non-exhaustive examples.

The processor 140 may determine a developing condition corresponding to the calculated temperature, and control the print engine 110 to perform a print job requested based on the determined developing condition.

In some examples, the developing operation may be affected by the internal temperature of the image forming apparatus 100. Before or a predetermined time after performing a print job in which the DC motor 120 generates heat, the temperature of the DC motor 120 may be the same as the temperature of the image forming apparatus 100.

Therefore, the processor 140 may determine a developing condition corresponding to the calculated temperature and control the print engine 110 based thereon. In the above-described examples, the developing condition varies. In some example implementations, all the conditions in a printing process such as a fixing condition, a charging condition, etc. may be determined according to the calculated temperature.

Referring to FIG. 1, the DC motor 120 and the driving circuit 130 have been illustrated as separate configurations, but in some example implementations, the DC motor 120 may be included in the driving circuit 130.

As described above, the simple elements constituting the image forming apparatus have been illustrated and described, but in some example implementations, various elements could be additionally provided, as described below with reference to FIG. 2.

Figure 2:
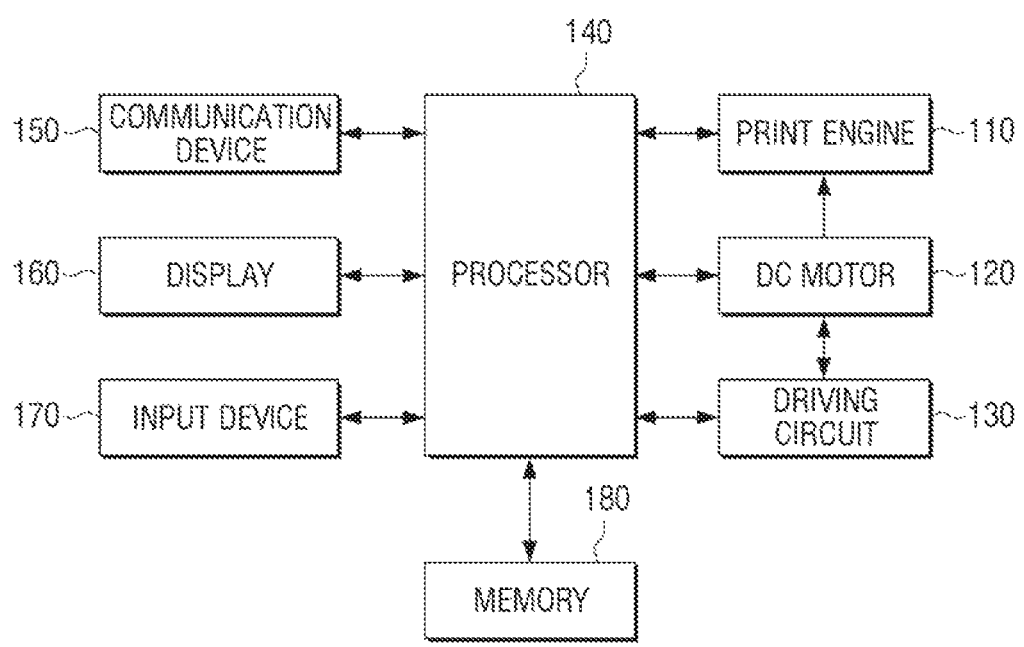
FIG. 2 is a block diagram of an example configuration of an image forming apparatus.

FIG. 2 is a block diagram to explain a detailed configuration of an image forming apparatus according to an example.

Referring to FIG. 2, an image forming apparatus 100 according to an example may include a print engine 110, a DC motor 120, a driving circuit 130, a processor 140, a communication device 150, a display 160, an input device 170, and a memory 180.

The print engine 110, the DC motor 120, and the driving circuit 130 have been described with reference to FIG. 1, and thus redundant description will be omitted. The processor 140 also has been described with reference to FIG. 1. Therefore, the description in FIG. 1 will be omitted, and the configurations added to FIG. 2 will be described below.

The communication device 150 may be connected to a print control terminal device, and may receive print data from the print control terminal device. The print control terminal device may be an electronic device for providing print data such as a PC (Personal Computer), a laptop, a tablet PC, a smartphone, a server, etc.

The communication device 150 may be formed to connect the image forming apparatus 100 to an external device. The image forming apparatus 100 may be connected to the print control terminal device via a local area network (LAN) and the Internet network as well as a universal serial bus (USB) port, or a wireless communication (e.g., Wi-Fi 802.11a/b/g/n, NFC, Bluetooth, etc.) port. Such the communication device 150 may be referred to as a transceiver.

The display 160 may display various information provided from the image forming apparatus 100. The display 160 may display an operation state of the image forming apparatus 100, or a user interface window for selecting user selectable functions and operations.

The display 160 may display an operation state of the image forming apparatus 100. For example, when the image forming apparatus 100 operates in a stress mode, the display 160 may display that an operation is performed at a lower print speed because the temperature in the image forming apparatus 100 is high, or that a print operation cannot be performed when the temperature of the DC motor 120 is beyond the first and second temperature ranges.

The input device 170 may include a number of function keys for setting or selecting various functions provided by the image forming apparatus 100. The input device 170 may include a device such as a mouse, a keyboard, etc. and/or a touch screen that can additionally perform the function of the display 160. The user may input various driving commands for the image forming apparatus 100.

The memory 180 may store print data. The memory 180 may store print data received from the communication device 150. The memory 180 may include an external storage medium, a removable disk including a USB memory, a web-server through a network, etc. as well as a storage medium in the image forming apparatus 100.

The memory 180 may store a look-up table for controlling the DC motor 120. The look-up table may be a target driving speed corresponding to a control command for the DC motor 120, or a look-up table for a voltage control value (Pulse Width Modulation (PWM) Duty) corresponding to a plurality of shunt voltages (Vsense). The memory 180 may store information on the current magnitude for temperature measurement.

The memory 180 may store information on a temperature range in which the image forming apparatus 100 enters a stress mode, and operation information of the image forming apparatus 100 in the stress mode as well as information on the sensed developing condition for each temperature.

The memory 180 may store temperature information of the DC motor 120 corresponding to a voltage value sensed by the ADC port. In some examples, the memory 180 may store calculation information for calculating the temperature information.

When receiving print data from the communication device 150, the processor 140 may determine the operation mode of the image forming apparatus 100 according to the number of prints of the received print data and the temperature of the DC motor 120.

The processor 140 may control the print engine 110 to print the received print data according to the determined operation mode. If the determined operation mode is a stress mode, the processor 140 may control the display 160 to display a message informing that the operation is performed with limited print speed.

The calculated temperature is beyond the first and second temperature ranges, the processor 140 may control the display 160 to display a message that a print operation cannot be performed immediately, or control the communication device 150 to transmit information corresponding to the message to the print control terminal device to which print data is transmitted.

When the temperature of the DC motor 120 drops to a temperature at which a print job is possible after the print data is received, the processor 140 may control the print engine 110 so that print data that has not been printed may be printed.

The image forming apparatus 100 may sense or determine the temperature of the DC motor (e.g., the temperature inside the image forming apparatus 100) based on the voltage value of the shunt resistance. Therefore, the image forming apparatus 100 may perform a print job in a more stable manner, even without any temperature sensor.

In some examples, the image forming apparatus 100 may perform a print job by changing the developing condition according to the sensed or determined temperature, in order to output a high quality image when there is a temperature change. Accordingly, the image forming apparatus 100 may be prevented from entering the stress mode unnecessarily in a low temperature environment, and the motor may be prevented from stepping out due to a torque deterioration of the motor that may be caused by a high temperature environment and a continuous print job. Therefore, printing performance may be improved without additional cost.

In addition, is it possible to provide a driving power to a DC motor using power from a driving driver (or motor-driver) integrated circuit (IC) even without any temperature measurement, and thus without any additional power circuit design for temperature measurement.

Referring to FIG. 1 and FIG. 2, it has been described above that one driving circuit controls one DC motor. However, in some example implementations, one driving circuit may control a plurality of DC motors, and one driving circuit may control a Brushless DC (BLDC) motor or a step motor while controlling a DC motor.

The DC motor 120 is illustrated in FIGS. 1 and 2, as being a separate configuration that is distinct from a print engine or a driving circuit, but in some implementations, the DC motor may be included in the print engine, or the driving circuit.

It has been described that in some examples, the temperature of the DC motor is calculated based on the voltage value of the shunt resistance, but in some example implementations, it is possible to use the calculated temperature of the DC motor as the internal temperature of the image forming apparatus 100. For example, before a print job, or during a predetermine time period after performing a print job, the temperature of the DC motor may be the same as the internal temperature of the image forming apparatus. Therefore, the temperature of the DC motor at this point may be used as the internal temperature of the image forming apparatus.

Figure 3:
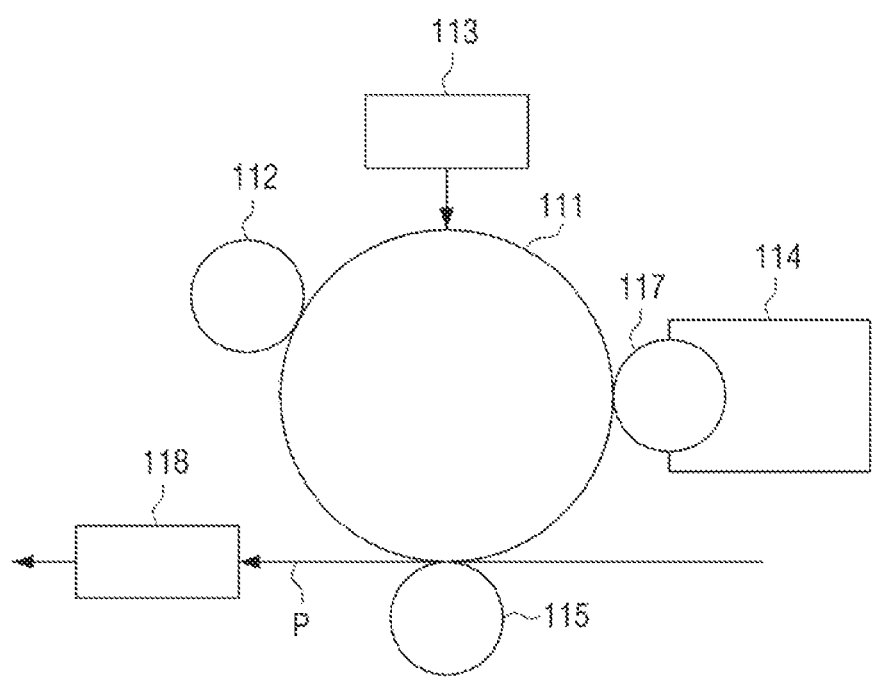
FIG. 3 is a schematic diagram of an example configuration of the print engine of FIG. 1.

FIG. 3 illustrates an example configuration of the print engine of FIG. 1.

Referring to FIG. 3, a print engine 110 may include a photoconductive drum 111, a charger 112, an exposure apparatus 113, a developer 114, a transferring apparatus 115, and a fuser 118.

The print engine 110 may further include a paper feeder for providing a recording medium P (e.g., paper). The electrostatic latent image may be formed in the photoconductive drum 111. The photoconductive drum 111 may be referred to as a photosensitive drum, a photosensitive belt, etc. according to its form, depending on examples.

For ease of understanding, a configuration of the print engine 110 corresponding to a single color will be described. In some example implementations, the print engine 110 may include a plurality of photoconductive drums 111, a plurality of chargers 112, a plurality of exposure apparatuses 113, and a plurality of developers 114, an intermediate transfer belt, etc. corresponding to a plurality of colors.

The charger 112 may charge the surface of the photoconductive drum 111 to a uniform potential. The charger 112 may include a corona charger, a charging roller, a charging brush, or the like.

The exposure apparatus 113 may form an electrostatic latent image on the surface of the photoconductive drum 111 by changing a surface potential of the photoconductive drum 111 according to image information to be printed. For example, the exposure apparatus 113 may irradiate light modulated according to information of an image to be printed onto the photoconductive drum 111 and form an electrostatic latent image. The exposure apparatus 113 may be referred to as a light injector, and a Light Emitting Diode (LED) may be used as a light source.

The developer 114 may include a developing agent therein and develop the electrostatic latent image into a visible image. The developer 114 may include a developing roller 37 which supplies the developing agent to the electrostatic latent image. For example, the developing agent may be supplied to the electrostatic latent image formed on the photoconductive drum 111 from the developing roller 117 due to a development field formed between the developing roller 117 and the photoconductive drum 111.

The visible image formed onto the photoconductive drum 111 may be transferred to the recording medium P by the transferring apparatus 115 or a medium transfer belt. The transferring apparatus 115, for example, may transfer a visible image to a printing medium by an electrostatic transfer method. The visible image may be attached to the recording medium P due to electrostatic attraction.

The fuser 118 may fix the visible image to the printing medium P by applying heat and pressure to the visible image on the recoding medium P. Through a series of processes, a print job may be completed.

The developing agent may be used every time when an image forming job is performed, and run out (or exhausted) when it is used more than a predetermined time. In this case, a unit for storing the developing agent (e.g., the developer 114) needs to be replaced by a new one. Components or constituent elements that can be replaced during a process of using an image forming apparatus 100 may be a consumable or replaceable unit. A memory (or a Customer Replaceable Unit Monitor (CRUM) chip) may be attached to the consumable unit to more suitably manage the consumable unit.

The DC motor 120 may perform operations to rotate each configuration of the print engine 110. In some examples, one DC motor 120 may simultaneously rotate a plurality of configurations of the print engine 110, or a combination of a plurality of motors may rotate the plurality of configurations.

In some examples, the print engine comprises configurations or features directly relevant to image forming, as described above. In some examples, the print engine 110 may further include a paper transferring device for moving paper loaded in a load tray to the transferring device and the fixing device.

Figure 4:
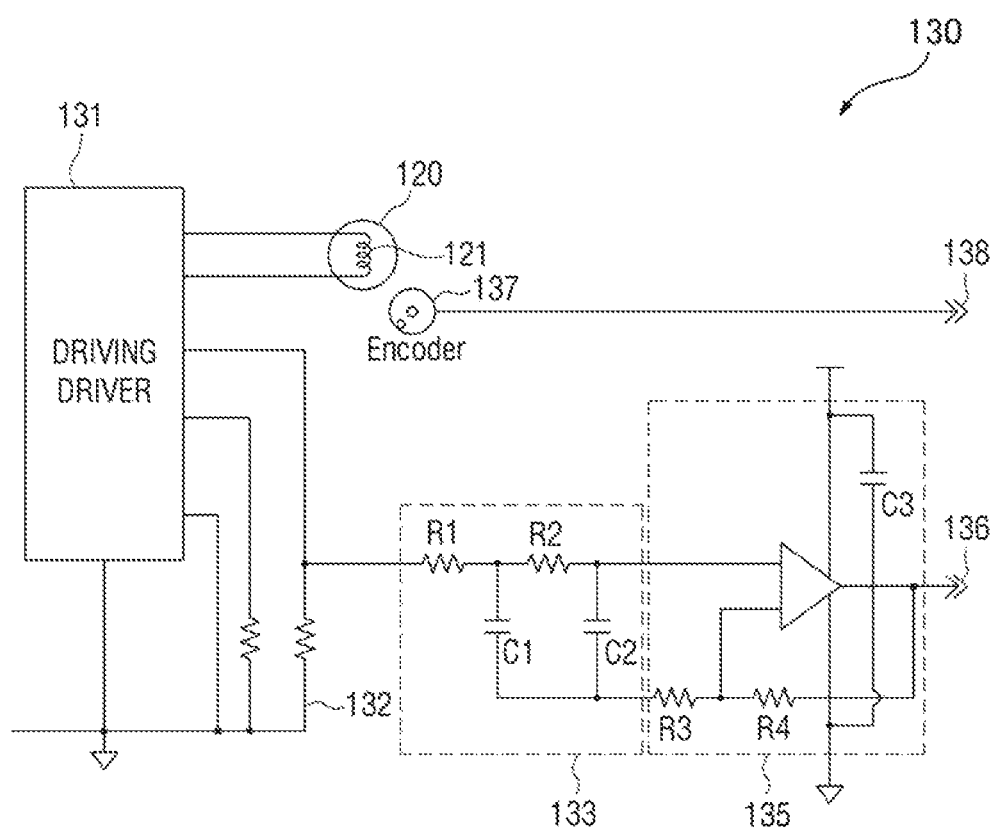
FIG. 4 is a circuit diagram of the driving circuit of FIG. 1.

FIG. 4 is a circuit diagram according to an example of the driving circuit of FIG. 1.

Referring to FIG. 4, a driving circuit 130 may include a driving driver (or motor driver) 131, a shunt resistance 132, a filtering circuit 133, and an amplification circuit 135.

The driving driver (or motor driver) 131 may provide a constant current to the DC motor 120. For example, the driving driver (or motor driver) 131 may receive a control command for the DC motor from the processor 140. The control command may include control commands such as rotation start/stop, acceleration/deceleration, speed command value, etc. for the DC motor 120.

The control command may be transmitted from the processor 140 through a Serial Peripheral Interface (SPI) that exchanges data through a series communication between two devices, and a serial communication interface such as $I^2C$ which is a bidirectional serial bus.

The driving driver (or motor driver) 131 may provide a constant current to the DC motor 120. The driving driver 131 may feedback a voltage value of the shunt resistance 132 and control the magnitude of the constant current provided to the DC motor 120. The driving driver 131 may be a chopping type driving driver IC that chops a driving voltage and provides a constant current.

The shunt resistance 132 may be a resistance for sensing the magnitude of the constant current flowing through a single coil of the DC motor 120.

In some examples, the voltage value of the shunt resistance 132 may have a different rising time according to the temperature of the coil, and thus the voltage value of the shunt resistance 132 may be smoothed and used using the filtering circuit 133, as will be described with reference to FIG. 8.

The filtering circuit 133 may perform low pass filtering on the voltage of the shunt resistance 132. The filtering circuit 133 may comprise an RC smoothing circuit consisting of a plurality of resistances R1 and R2 and a plurality of capacitors C1 and C2. Referring to FIG. 4, the filtering circuit 133 may be achieved by connecting two RC circuits in series, in some examples. In some example implementations, a single RC smoothing circuit may be used. It is also possible to achieve a filtering circuit with a circuit configuration that is different from the RC circuit.

The smoothed voltage value may not be up to the ADC level of the processor 140, and thus the smoothed voltage value may be amplified using an amplification circuit that amplifies the voltage value at a predetermined ratio. When the smoothed voltage value is enough to be measured by the ADC of the processor 140, the amplification circuit 135 will be omitted.

The amplification circuit 135 may amplify the output value of the filtering circuit 133. The amplification circuit 135 may consist of OP-amp, a plurality of resistances (or resistance elements) R3 and R4 and a capacitor C3.

The voltage value output through the circuit may be input into the ADC port 136 of the processor 140, and the processor 140 may monitor the change in load in real time.

Figure 7:
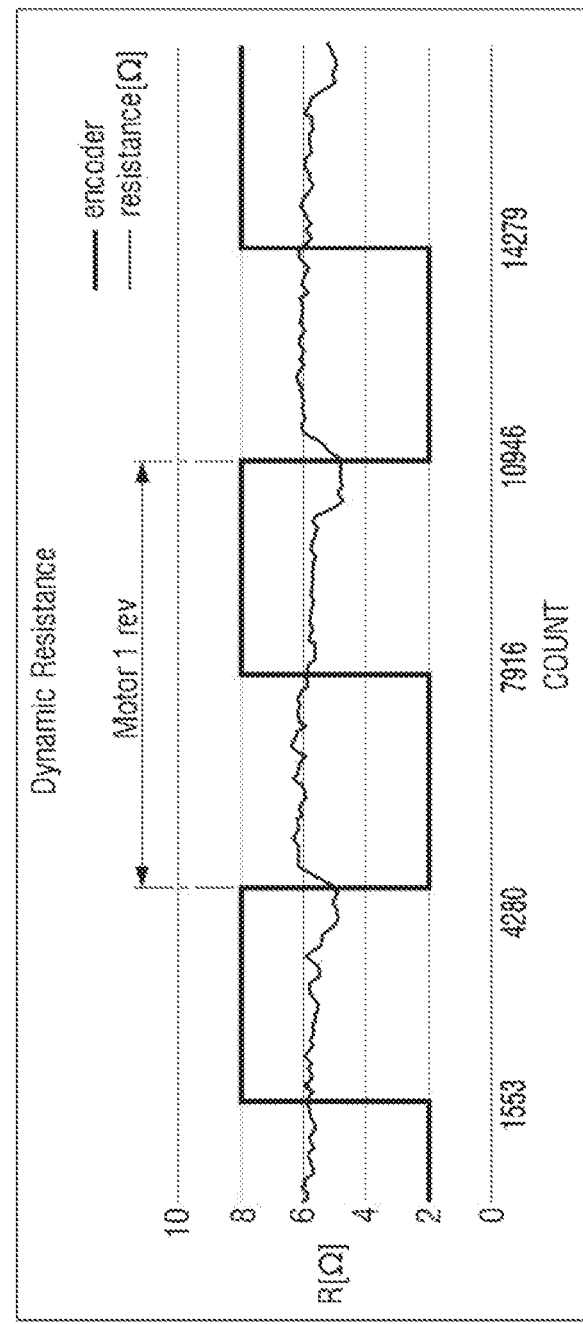
FIG. 7 is a graph illustrating a change in resistance value according to a position of a brush of an example DC motor.

Referring to FIG. 7, with regard to the voltage value of the shunt resistance 132, resistance values of both ends of the coil may be different according to the location of the brush during one rotation. Since the motor coil resistance is not constant during one rotation of the DC motor 120, the voltage value of the shunt resistance may be sensed at a fixed location.

With further reference to FIG. 4, at the fixed position, the sensing operation may be performed at a time when the output signal of the encoder 137 has a falling edge by using the encoder 137 that outputs a predetermined signal every time the DC motor 120 rotates once. The output signal of the encoder 137 may be input into a port 138 of the processor 140, and the processor 140 may determine a time for reading the voltage value of the ADC port 137.

The reason why the voltage value of the shunt resistance 132 is used for estimating the temperature of the DC motor will be described with reference to FIG. 5 to FIG. 8.

Figure 5:
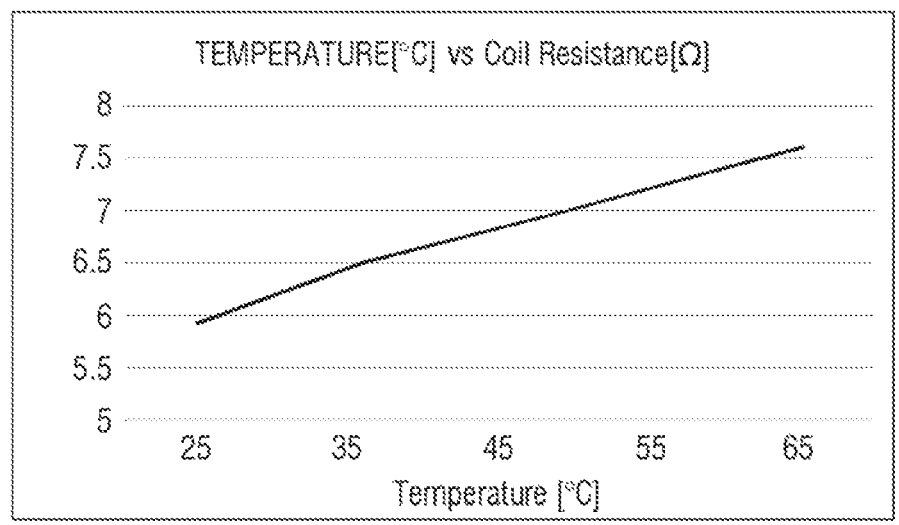
FIG. 5 is a graph illustrating a relationship between a temperature and a coil resistance in an example direct current (DC) motor.
Figure 6:
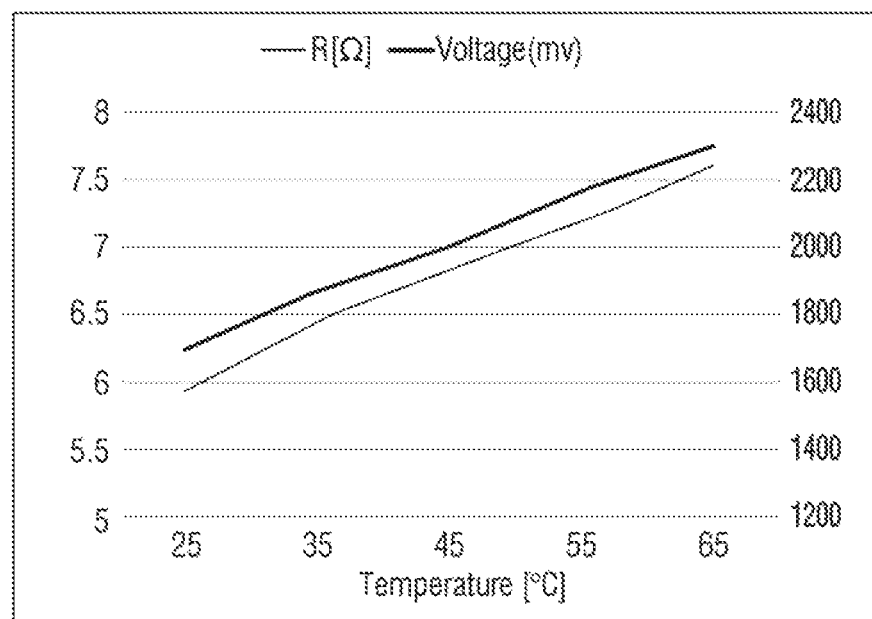
FIG. 6 is a graph illustrating a relationship between a temperature and a sensing voltage and a relationship between a temperature and a coil resistance.

FIG. 5 is a graph illustrating a relationship between a temperature and a coil resistance in a DC motor, and FIG. 6 is a graph illustrating a relationship between a temperature and a sensing voltage and a relationship between a temperature and a coil resistance.

Referring to FIG. 5, as the temperature of the DC motor increases, the resistance value of the coil in the DC motor may proportionally increase.

Referring to FIG. 6, the resistance value of the shunt resistance may proportionally increase as well as the resistance of the coil, as the temperature of the DC motor increases.

Referring to FIG. 5 and FIG. 6, given that the resistance value of the coil of the DC motor is affected by the temperature, the resistance value of the coil may be used for estimating the temperature of the DC motor.

The resistance value (R) may be calculated through the voltage (V) and the current value (I) applied to the coil based on the relationship R=V/I. Since the constant current under the control of the processor 140 is provided to the DC motor 120, the constant current value may be obtained, and the magnitude of the voltage may be obtained by using the voltage value of the shunt resistance. The voltage value of the shunt resistance may be in proportion to the resistance value of the coil.

Considering that the voltage of the shunt resistance is in proportion to the temperature of the DC motor, the temperature of the DC motor may be obtained by using the voltage value of the shunt resistance.

However, when the DC motor is driven, a counter-electromotive force component may be introduced and it is difficult to measure the resistance of the coil. Therefore, in some examples, the voltage of the shunt resistance may be measured in a state where there is no counter-electromotive force component, by providing a current flowing through the coil of the driving motor, at a magnitude where the DC motor does not rotate.

In addition, considering that the resistance values of both ends of the coil in the DC motor are different according to the brush position due to the internal structure characteristic, the voltage of the shunt resistance may be measured, as will be described with reference to FIG. 7.

FIG. 7 is a view to explain a change in resistance value according to a position of a brush of a DC motor.

Referring to FIG. 7, the coil resistance of the DC motor varies in a relatively large range within one rotation section during which the temperature of the DC motor is not significantly different. This is because the resistance value of both ends of the coil varies depending on the brush position of the DC motor.

Therefore, the measurement may be performed at the same brush position at the time of detecting the temperature of the motor so that the variation of the resistance value according to the brush position does not affect temperature sensing.

According to an example, temperature measurement may be performed at a falling edge of the output signal of an encoder (or Index Sensor) for sensing the speed of the DC motor. In some examples, the falling edge of the output signal of the encoder may be used, and a time point apart from the rising or falling edge by a predetermined time may be used. In addition to the encoder, a home sensor of a unit terminal driven by the DC motor may be used.

Figure 8A:
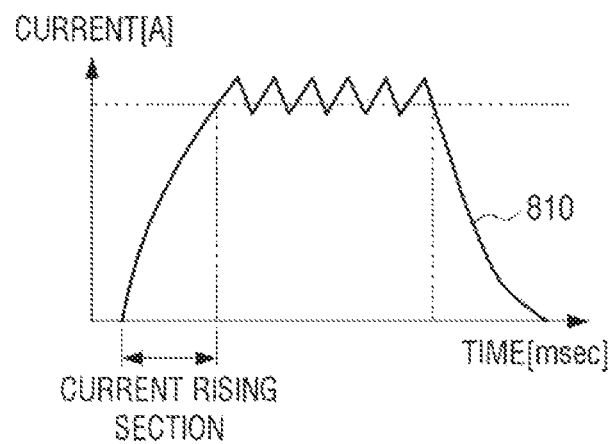
FIGS. 8A, 8B, and 8C are graphs illustrating a phase current and a voltage supplied to an example DC motor.
Figure 8B:
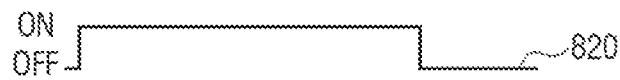
Figure 8C:
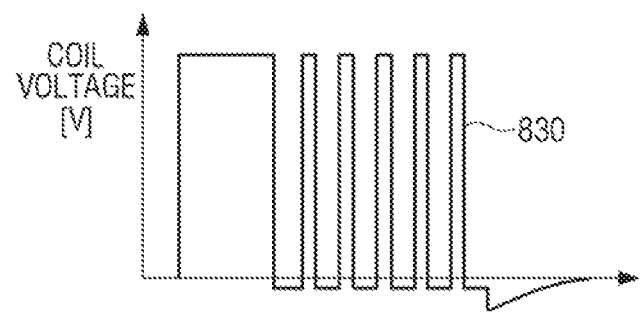

FIG. 8A, 8B, 8C illustrate a phase current (810) and a voltage (830) provided to a DC motor, according to an on-off signal 820.

In some examples, the constant current driver IC may control the motor driving current (voltage) within the magnitude of the current set at a reference voltage terminal of the constant current driver IC.

The maximum current magnitude available for motor input may be set at a reference voltage terminal of the constant current driver IC. The reference voltage of the driver IC may be determined according to the equation below.

Current=Reference voltage/(Gain×Shunt resistance), where the Reference voltage is a reference voltage, the Shunt resistance is a resistance magnitude of the shunt resistance, and Gain is a predetermined gain constant.

The constant current driver IC may include a chopping circuit that receives a feedback voltage of a shunt resistance connected to the driver IC so that the current set based on the equation flows through the coil of the DC motor 120.

In some examples, a motor terminal voltage may be chopped and controlled by changing a PWM duty to provide a constant current to a DC motor.

For temperature measurement, the DC motor may not be driven, the voltage value of the shunt resistance corresponding to the motor temperature may be detected while a current of a predetermined magnitude for not driving the DC motor is provided.

The driving driver (or motor driver) may monitor a sensing resistance terminal and adjacent a phase voltage using a chopping circuit so that a motor coil input current may be constantly maintained. When the value of the current flowing through the coil becomes constant, the resistance of the coil may be in proportion to a sensing voltage. The sensing voltage may be detected, in order to detect the temperature of the coil resistance, e.g., the temperature of the motor.

When the coil temperature is high, the resistance value of the coil may rise, and the rising time of a phase current to reach at the same current may become longer. The coil-applied current may be detected as it is at the sensing voltage terminal of the driver, and thus the driving driver may extend a time of the PWM duty of the provided phase voltage to apply the set current.

The rising time for applying the same current may be different according to a coil temperature, and the area of the sensing voltage may be different. Since the phase voltage is chopped, the sensing voltage may be the chopping voltage. Therefore, referring to FIG. 4, the filtering circuit 133 may be used to monitor the voltage.

Figure 9:
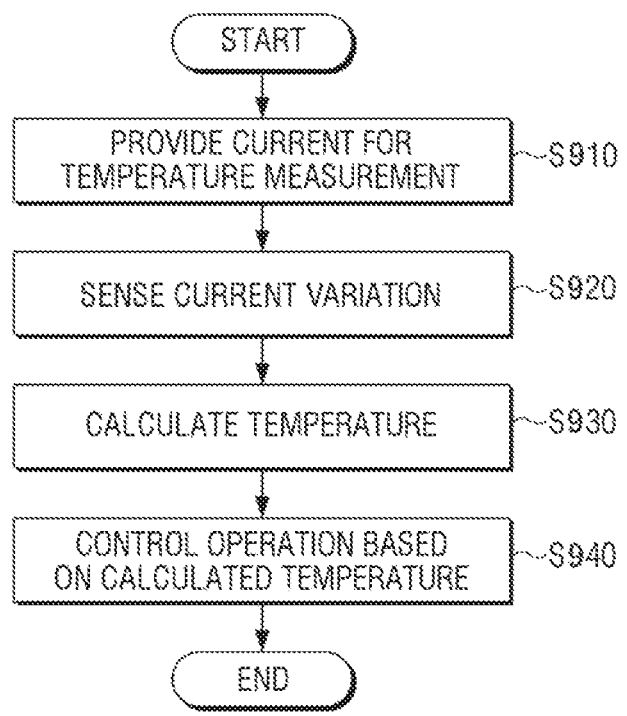
FIG. 9 is a flowchart illustrating example control operations of an example image forming method.

FIG. 9 is a flowchart illustrating an example of an image forming method.

At process S910, a current may be provided to a DC motor. It is possible to provide a DC motor with a current of a predetermined magnitude (i.e., a current for temperature measurement) that prevents the DC motor from rotating, in order to block the counter-electromotive force generated in accordance with the rotation of the DC motor. In some example implementations, the current for temperature measurement described above may be provided after the brush of the DC motor is driven to be disposed at a predetermined position.

The variation of the current provided to the DC motor may be sensed at process S920. For example, the voltage value of the shunt resistor for sensing the magnitude of the constant current provided to the DC motor may be used to sense the variation of the current provided to the DC motor. The value of the shunt resistance may change in proportion to the temperature change of the coil in the DC motor.

The temperature of the DC motor may be calculated based on the variation of the current flowing through the DC motor at process S930. For example, it is possible to calculate the predetermined value by integrating the variation of the current flowing through the DC motor, and calculate the temperature of the DC motor using the calculated value. In some example implementations, the temperature value corresponding to the value calculated using a look-up table may be obtained.

The operation of the image forming apparatus may be controlled based on the calculated temperature at process S940. When the calculated temperature is within a predetermined first temperature range, a print job requested in a normal mode may be performed, and when the calculated temperature is within a second temperature range higher than the first temperature range, the requested print job may be performed in a stress mode in which at least one of the number of consecutive prints or the print speed is reduced. If the calculated temperature is lower than the first temperature range or higher than the second temperature range, the requested print job may not be performed.

In addition, the developing condition corresponding to the calculated temperature may be determined, and the print job may be performed based on the determined developing condition.

Figure 10:
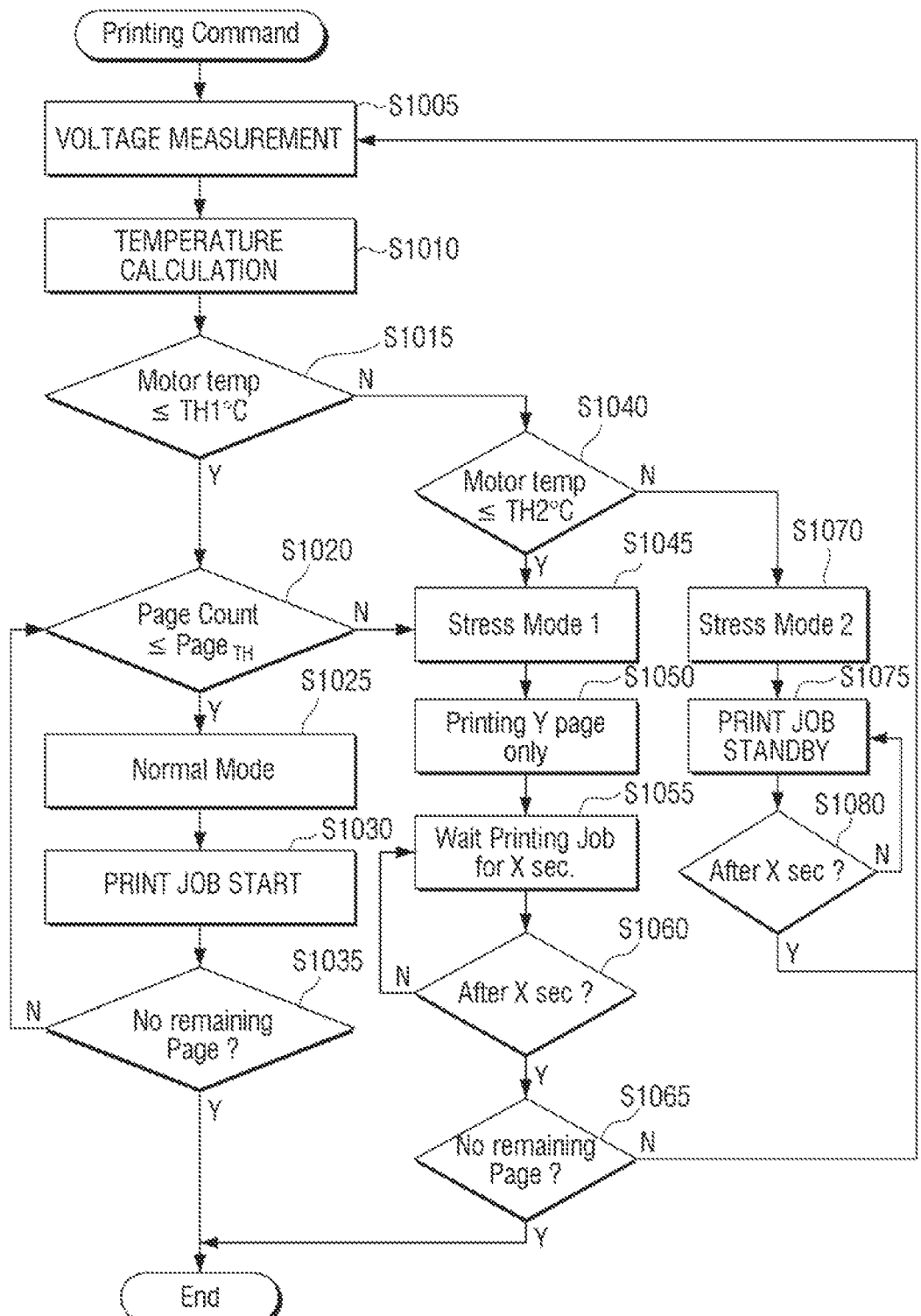
FIG. 10 is a flowchart illustrating example processes of the control operations of FIG. 9.

FIG. 10 is a flowchart illustrating an example of the control operations described with reference to FIG. 9.

At operation S1005, when a print command is input, a voltage value of a sensing resistance may be measured. At operation S1010, and the temperature may be calculated based on the measured voltage value.

If the calculated temperature is lower than a predetermined first temperature TH1 at operation S1015-Y, the number of consecutive prints may be confirmed at operation S1020. The first temperature may be 50° C., but is not limited thereto.

If the number of consecutive prints is less than a predetermined number at operation S1020-Y, the mode may be determined as a normal mode at operation 1025, and the apparatus may perform a print job in a normal model at operation S1030. The predetermined number may be 100, but is not limited thereto. In a normal mode, the print job may be performed in a normal mode up to the predetermined number of consecutive prints ($Page_{TH}$: e.g., 100).

If there is a subsequent print job at operation S1035-N, the apparatus may return to a previous determination operation, and if there is no subsequent print job, the apparatus may complete the operation at process S1035-Y.

If the calculated temperature is not lower than a predetermined first temperature at process S1015-N, it may be confirmed whether the calculated temperature is lower than a predetermined second temperature TH2 at process S1040. The second temperature may be 70° C., but is not limited thereto.

As a result of confirmation, if the calculated temperature is lower than the second temperature, and there is a print job request for more than the predetermined number of prints at process S1040-Y, the apparatus may enter the first stress mode at process S1045.

When entering the first stress mode, after performing a print job of up to the consecutive print number (e.g., 5) which is available in the first stress mode at process S1050, the driving of the motor may be stopped for a predetermined time (e.g., 10 seconds) at process S1055.

After the predetermined time (e.g., 10 seconds) passes at process S1060, the apparatus may confirm whether there is a print job to be operated at process S1065, and if there is a print job, the image forming apparatus may return to the operation for measuring the temperature of the DC motor at process S1065-N.

When the calculated temperature is higher than the second temperature at process S1040-N, the image forming apparatus may enter the second stress mode at process S1070. When entering the second stress mode, the apparatus may stand by for a predetermined time (e.g., 10 seconds) without carrying out any print job at processes S1075 and S1080, the image forming apparatus may be controlled to return to the operation for measuring the temperature of the DC motor again.

Referring to FIG. 9 and FIG. 10, the image forming method may include sensing the temperature of the DC motor (the temperature inside the image forming apparatus) based on the voltage value of the sensing resistance, and performing a print job in a more stable manner, than an image forming apparatus without a temperature sensor. The image forming method may perform a print job by changing a developing condition with the sensed temperature, and thus it is possible to output a high-quality image despite a temperature change. In addition, there is no need to enter a stress mode unnecessarily in a low environment, and the motor may be prevented in advance from stepping out due to a torque deterioration of the motor caused by a high temperature and a continuous print job. Therefore, print performance may be improved while minimizing any additional cost.

In some examples, the image forming method described above may be implemented by a program and provided to an image forming apparatus. For example, a program including the image forming method may be stored in a non-transitory computer readable medium. The non-transitory readable medium may be compact disc (CD), digital video disc (DVD), hard disc drive (HDD), solid state drive (SSD), blue-ray disc, USB memory, memory card, read-only memory (ROM), etc.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:
1. An image forming apparatus, comprising:
a print engine to form an image;
a DC motor to drive the print engine; and a driving circuit to provide a current to the DC motor, the driving circuit including a shunt resistance to sense a variation of the current provided to the DC motor, a filtering circuit to perform low pass filtering on a voltage of the shunt resistance, and an amplification circuit to amplify an output value of the filtering circuit and to provide the amplified output value to a processor, the processor to calculate a temperature of the DC motor based on the variation of the current flowing through the DC motor, and to control an operation of the image forming apparatus based on the calculated temperature.

2. The apparatus according to claim 1, the processor to control the driving circuit to provide a current of a predetermined magnitude which prevents the DC motor from rotating to the DC motor.

3. The apparatus according to claim 1, the processor to calculate the temperature of the DC motor based on the variation of the current when a brush of the DC motor is disposed at a predetermined position.

4. The apparatus according to claim 1, wherein the driving circuit comprises an encoder to output a predetermined signal when the DC motor rotates once,
the processor to calculate the temperature of the DC motor based on the variation of the current when the predetermined signal is received from the encoder.

5. The apparatus according to claim 1, wherein the driving circuit further comprises,
a motor driver to provide a constant current to the DC motor.

6. The apparatus according to claim 5, the voltage of the shunt resistance being variable in proportion of a temperature change of a coil in the DC motor.

7. The apparatus according to claim 5, the motor driver to feedback the voltage of the shunt resistance and to chop a driving voltage.

8. The apparatus according to claim 1, the processor to perform a requested print job in a normal mode based on the calculated temperature being within a predetermined first temperature range, and to perform the requested print job in a stress mode, in which at least one of a number of consecutive prints or a print speed is reduced, based on the calculated temperature being within a second temperature range that is higher than the predetermined first temperature range.

9. The apparatus according to claim 8, the processor to avoid performing the requested print job, when the calculated temperature is lower than the first temperature range or higher than the second temperature range.

10. An image forming method comprising:
providing a current to a DC motor;
sensing a variation of the current provided to the DC motor using a voltage value of a shunt resistance;
calculating a temperature of the DC motor based on the variation of the current flowing through the DC motor; and
controlling an operation of an image forming apparatus based on the calculated temperature,
wherein the sensing comprises sensing the variation of the current provided to the DC motor using the voltage value of the shunt resistance to feedback information on a magnitude of a constant current.

11. The method according to claim 10, wherein the providing of the current comprises providing a current of a predetermined magnitude which prevents the DC motor from rotating to the DC motor.

12. The method according to claim 10, wherein the sensing comprises sensing a current variation when a brush of the DC motor is disposed at a predetermined position.

13. The method according to claim 10, wherein the controlling comprises, performing a requested print job in a normal mode when the calculated temperature is within a predetermined first temperature range, and when the calculated temperature is within a second temperature range that is higher than the predetermined first temperature range, performing the requested print job in a stress mode in which a number of consecutive prints is reduced or a print speed is reduced.

14. The method according to claim 13, wherein the controlling comprises avoiding to perform the requested print job when the calculated temperature is lower than the first temperature range or higher than the second temperature range.

15. An image forming apparatus, comprising:
a print engine to form an image;
a DC motor to drive the print engine;
a driving circuit to provide a current to the DC motor, and to sense a variation of the current provided to the DC motor; and
a processor to:
calculate a temperature of the DC motor based on the variation of the current flowing through the DC motor,
control an operation of the image forming apparatus based on the calculated temperature,
perform a requested print job in a normal mode based on the calculated temperature being within a predetermined first temperature range, and
perform the requested print job in a stress mode, in which at least one of a number of consecutive prints or a print speed is reduced, based on the calculated temperature being within a second temperature range that is higher than the predetermined first temperature range.

16. The apparatus according to claim 15, the processor to control the driving circuit to provide a current of a predetermined magnitude which prevents the DC motor from rotating to the DC motor.

17. The apparatus according to claim 15, the processor to calculate the temperature of the DC motor based on the variation of the current when a brush of the DC motor is disposed at a predetermined position.

18. The apparatus according to claim 15, wherein the driving circuit comprises an encoder to output a predetermined signal when the DC motor rotates once,
the processor to calculate the temperature of the DC motor based on the variation of the current when the predetermined signal is received from the encoder.

19. The apparatus according to claim 15, wherein the driving circuit comprises:
a motor driver to provide a constant current to the DC motor;
a shunt resistance to sense a variation of the constant current;
a filtering circuit to perform low pass filtering on a voltage of the shunt resistance; and
an amplification circuit to amplify an output value of the filtering circuit and to provide the amplified output value to the processor.

20. The apparatus according to claim 19, the voltage of the shunt resistance being variable in proportion of a temperature change of a coil in the DC motor.

* * * * *